H. S. Frost,
Door Spring.
N° 67,525.   Patented Aug. 6, 1867.
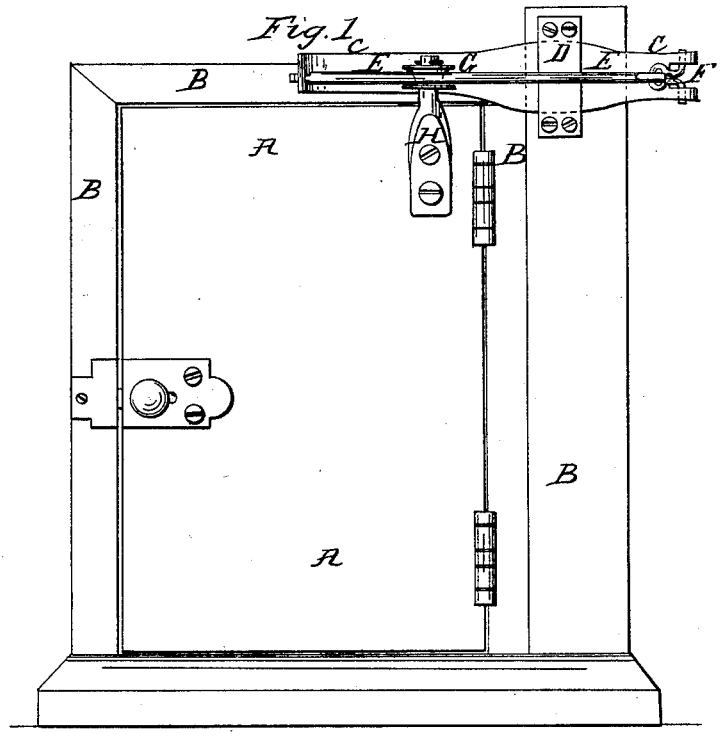
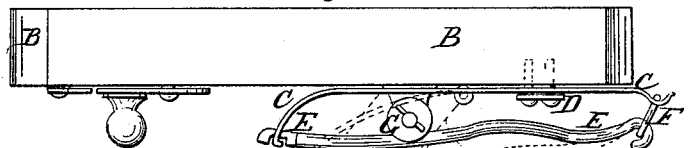
Witnesses:
Theo Tusche
Wm ...
Inventor
Henry S Frost
Per Munn & Co
Attorneys

United States Patent Office.

HENRY S. FROST, OF WATERTOWN, CONNECTICUT.

Letters Patent No. 67,525, dated August 6, 1867.

---

IMPROVEMENT IN DOOR-SPRINGS.

---

The Schedule referred to in these Letters Patent and making part of the same.

---

TO ALL WHOM IT MAY CONCERN:

Be it known that I, HENRY S. FROST, of Watertown, in the county of Litchfield, and State of Connecticut, have invented a new and improved Door-Spring; and I do hereby declare that the following is a full, clear, and exact description thereof, which will enable those skilled in the art to make and use the same, reference being had to the accompanying drawings, forming part of this specification, in which—

Figure 1 is an inside view of a door and frame to which my improved spring has been attached.

Figure 2 is a top view of the same, showing in red lines the position of the parts when the door is partially opened.

Similar letters of reference indicate corresponding parts.

My invention consists in the combination of a spring-bar and friction-pulley with each other, and with the door-frame and door, and in the peculiar manner in which the rear ends of the bar and spring are connected to each other; the whole being constructed and arranged as hereinafter more fully described.

A is the door, and B is the door-frame, about the construction of which parts there is nothing new. C is the spring, which is secured to the frame B by a keeper, D, or in some other substantial and convenient manner. The forward end of the spring C is bent up and has a slot formed in it for the reception of the forward end of the bar E. The rear end of the spring C is notched and bent down, as shown in figs. 1 and 2, so as to form ears for the reception of the eye or link F that connects the rear end of the bar E to the rear end of the said spring. The bar E is made in substantially the form shown in fig. 2, and has a catch formed upon its forward end which enters and catches upon the slot formed in the forward end of the spring C, as shown in figs. 1 and 2. The rear end of the bar E has a hook or ear formed upon it which takes hold of the eye or link F, by which it is connected to the rear end of the spring C. This construction allows the bar E to have the necessary play as the door A is opened and closed. G is a friction-roller or pulley revolving loosely upon an axle, H, which is securely attached to the door A, as shown in figs. 1 and 2. The face of the roller or pulley G is grooved for the reception of the bar E, along which the said pulley rolls as the door is opened and closed. This apparatus not only closes the door automatically when partially opened, and holds it closed, but it also holds it open when fully opened. And when not required for use the bar E, or the whole apparatus, is readily removed and stowed away, and can be quickly and easily replaced again when required for use.

I claim as new, and desire to secure by Letters Patent—

1. The combination of the spring C, bar E, and friction-roller or pulley G, with each other, and with the door A and door-frame B, substantially as herein shown and described and for the purpose set forth.

2. Connecting the rear ends of the spring C and bar E to each other by an eye or link F, substantially as herein shown and described, and for the purpose set forth.

HENRY S. FROST.

Witnesses:
GEORGE L. FIELD,
EBENEZER B. BEECHER.